United States Patent
Lee

(10) Patent No.: US 7,336,014 B2
(45) Date of Patent: Feb. 26, 2008

(54) STATOR OF OUTER ROTOR TYPE MOTOR FOR DRUM TYPE WASHER AND FABRICATING METHOD THEREOF

(75) Inventor: Woon Yong Lee, Gwangsan-gu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/043,975

(22) Filed: Jan. 28, 2005

(65) Prior Publication Data

US 2005/0194860 A1 Sep. 8, 2005

(30) Foreign Application Priority Data

Mar. 3, 2004 (KR) .................. 10-2004-0014310

(51) Int. Cl.
*H02K 1/06* (2006.01)
(52) U.S. Cl. .................... 310/217; 310/216
(58) Field of Classification Search ........ 310/214–218, 310/90
See application file for complete search history.

(56) References Cited

U.S. PATENT DOCUMENTS

| 4,835,839 | A | | 6/1989 | Forbes et al. |
| 5,969,455 | A | * | 10/1999 | Sakamoto .................... 310/194 |
| 6,127,760 | A | * | 10/2000 | Nagasaki et al. ............ 310/254 |
| 6,510,716 | B1 | * | 1/2003 | Kim et al. ....................... 68/24 |
| 6,819,025 | B2 | * | 11/2004 | Egawa et al. ................ 310/216 |
| 2001/0030484 | A1 | * | 10/2001 | Nakamura ................... 310/216 |
| 2002/0166912 | A1 | * | 11/2002 | Schneid ....................... 241/298 |
| 2003/0132675 | A1 | * | 7/2003 | Kwon et al. ................... 310/86 |
| 2004/0155550 | A1 | * | 8/2004 | Yamamoto et al. .......... 310/194 |
| 2004/0231789 | A1 | * | 11/2004 | Blackmore et al. .......... 156/294 |
| 2005/0067912 | A1 | * | 3/2005 | Murakami et al. ........... 310/216 |

FOREIGN PATENT DOCUMENTS

| EP | 1094144 | A2 | * | 4/2001 |
| JP | 01255452 | A | * | 10/1989 |
| WO | WO-92/22121 | A1 | | 12/1992 |

* cited by examiner

*Primary Examiner*—Thanh Lam
(74) *Attorney, Agent, or Firm*—Birch, Stewart, Kolasch & Birch, LLP

(57) ABSTRACT

The present invention provides an outer rotor type motor for a drum type washing machine to reduce material and weight for fabrication, simplify fabrication process, provide stable assembly of a stator to a fixing side, such as a tub or a bearing housing, prevent unwinding of stacked steel plates in assembling a helical core, and reduce stress on the steel plates of the core. The present invention includes a helical core having multiple layers formed by winding steel plates in a helix starting from a bottom layer to a top layer, the steel plate having a base portion with teeth projected from the base portion, wherein the steel plates are blanked on an electrical steel sheet in pairs opposing each other with the teeth alternately crossing each other, an upper insulator of an electric insulating material covered on an upper side of the helical core in a shape complementary to a shape of the helical core, and a lower insulator of an electric insulating material covered on a lower side of the helical core at the time of assembly with the upper insulator having a shape complementary to a shape of a helical core.

28 Claims, 8 Drawing Sheets

STATOR OF OUTER ROTOR TYPE MOTOR FOR DRUM TYPE WASHER AND FABRICATING METHOD THEREOF

This application claims the benefit of the Korean Application No. P2004-014310 filed on Mar. 3, 2004, which is hereby incorporated by reference.

BACKGROUND OF THE INVENTION

1. Field of the Invention

The present invention relates to a drum type washer, and more particularly, to a stator of an outer rotor type BLDC motor and fabricating method thereof, which is applicable to a direct coupling type drum type washer.

2. Discussion of the Related Art

Generally, a drum type washing machine performs washing operation with the aid of a drive force of a motor which spins a drum containing laundry, detergent, and water, to cause friction between laundry and water. The drum type washing machine causes almost no damage to the laundry, prevents tangling of the laundry, and brings about the effects of pounding and rubbing.

Drum type washing machines are categorized by an indirect coupling type and a direct coupling type according to a drive system. In the indirect coupling type, a drive force of a motor is indirectly transferred to a drum via a motor pulley and a belt wound to the drum pulley. In the direct coupling type, a rotor of a BLDC motor is directly coupled with a drum to directly transfer a drive force to the drum.

Yet, in the indirect coupling type system that transfers the drive force of the motor to the drum via the motor pulley and the belt wound on the drum pulley instead of transferring the drive force of the motor to the drum directly, energy loss occurs in the process of drive force transfer and considerable noise is generated.

Hence, the direct coupling drum type washer using the BLDC motor is widely used to solve the above problems of the drum type washer.

FIG. 1 is a cross-sectional diagram of a direct coupling drum type washer according to a related art.

Referring to FIG. 1, a tub 2 is provided within a cabinet 1, and a drum 3 is rotatably provided within the tub 2.

A motor is provided to a rear portion of the tub 2. Specifically, a stator 6 is fixed to a rear wall of the tub 2 and a rotor 5 encloses the stator 6 to be coupled to the drum 3 via a shaft.

A door 21 is provided to a front portion of the cabinet 1 and a gasket is provided between the door 21 and the tub 2.

A hanging spring 23 supporting the tub 2 is provided between an inside of a top portion of the cabinet 1 and an upper outer circumference of the tub 2, and a friction damper 24 is provided between an inside of a bottom portion of the cabinet 1 and a lower outer circumference of the tub 2 to attenuate vibration of the tub 2.

FIG. 2 is a perspective diagram of a stator in FIG. 1 and FIG. 3 is a perspective diagram of a sectional core (SC) applied to the stator in FIG. 2.

A method of manufacturing a stator core according to a related art is explained as follows.

First of all, a plurality of unit cores are fabricated by a pressing process of a steel plate. In doing so, each of the unit cores consists of teeth 151, a base 150, and a protrusion 500 opposite to the teeth 151 for forming a fastening hole 500a. A plurality of the unit cores are stacked to form a plurality of assemblies. And, a plurality of the assemblies are linked in a circumferential direction to complete a stator core that is so-called a stator core.

The protrusion 500 plays a role in standing a fastening force of a bolt as well as provides the fastening hole 500a necessary for securing a stator to the rear wall of the tub.

Yet, such a method of manufacturing the stator 6 with the sectional core SC is very complicated and brings about considerable loss of materials.

Meanwhile, a helical core, which is manufactured by helically stacking a steel plate consisting of teeth 151 and a base 150, is very useful in reducing the loss of materials and simplifying the manufacturing process. Yet, in manufacturing the helical core HC, the steel plate blanked like a strap needs to be helically bent. Hence, it is unable to provide a protrusion for coupling a stator with a tub to an inside of the core.

If the protrusion 500 is provided to the inside of the core in manufacturing the helical core HC, a core width of a part reserved for the protrusion is too large to bend the core.

Accordingly, a stator structure that enables the same role of the protrusion of the sectional core to be performed not by the core itself but by another portion is needed to be applicable to the helical core HC.

Meanwhile, it is important to sufficiently secure the rigidity of the protrusion provided with the fastening hole for securing the stator to the tub, which is explained as follows.

First of all, in a washer that rotates a drum directly using a BLDC motor, a stator is directly assembled to a fixing side of a rear portion of the tub. If the stator of a motor for a high capacity drum type washer weighs over 1.5 kg and if a dewatering rotational speed is 600~2,000 RPM, a fastening portion of the stator 6 is broken due to the stator weight, the vibration of the high rotation, and the shake and transformation of the rotor 5.

Specifically, in case that the stator is coupled with the rear wall of the tub of the drum type washer using the BLDC motor, a radial direction of the stator almost maintains parallel to a ground, the breakage of the fastening portion of the stator 6 to the rear wall of the tub gets worsened due to the vibration occurring on driving the washer.

Therefore, it is important to sufficiently secure the rigidity of the protrusion provided with the fastening hole for securing the stator 6 to the tub.

SUMMARY OF THE INVENTION

Accordingly, the present invention is directed to a stator of an outer rotor type motor for a drum type washer and fabricating method thereof that substantially obviate one or more problems due to limitations and disadvantages of the related art.

An object of the present invention is to provide an outer rotor type motor for a drum type washer and fabricating method thereof, by which a material and weight for fabrication are reduced, by which a fabrication process is simplified, and by which a stator can be stably assembled to a fixing side such as a tub or a bearing housing.

Another object of the present invention is to provide a stator of an outer rotor type motor for a drum type washer and fabricating method thereof, in which a stator can be stably assembled to a fixing side such as a tub or a bearing housing and by which the stator weighing at least 1.5 kg is applicable to a drum type washer BLDC motor having a rotational speed over 2,000 RPM.

A further object of the present invention is to provide a stator of an outer rotor type motor for a drum type washer and fabricating method thereof, by which a material for forming a helical core is reduced and by which a corresponding fabrication process is facilitated.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stator of an outer rotor type motor for a drum type washer according to the present invention includes a helical core having multiple layers formed by winding steel plates in a helix starting from a bottom layer to a top layer, the steel plate having a base portion with teeth projected from the base portion, wherein the steel plates are blanked on an electrical steel sheet in pairs opposing each other with the teeth alternately crossing each other, an upper insulator of an electric insulating material covered on an upper side of the helical core in a shape complementary to a shape of the helical core, and a lower insulator of an electric insulating material covered on a lower side of the helical core at the time of assembly with the upper insulator having a shape complementary to a shape of a helical core.

In this case, the steel plate is formed by blanking the electrical steel sheet in two rows to form at the base a notch recess having a same shape as a tip of each of the teeth.

Furthermore, in blanking the steel plates in two rows, ejector concaves are formed at the teeth of the steel plate to facilitate a separation from the other steel plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, one embodiment of the present invention is explained with reference to FIGS. 4 to 9 as follows.

Figure 1:
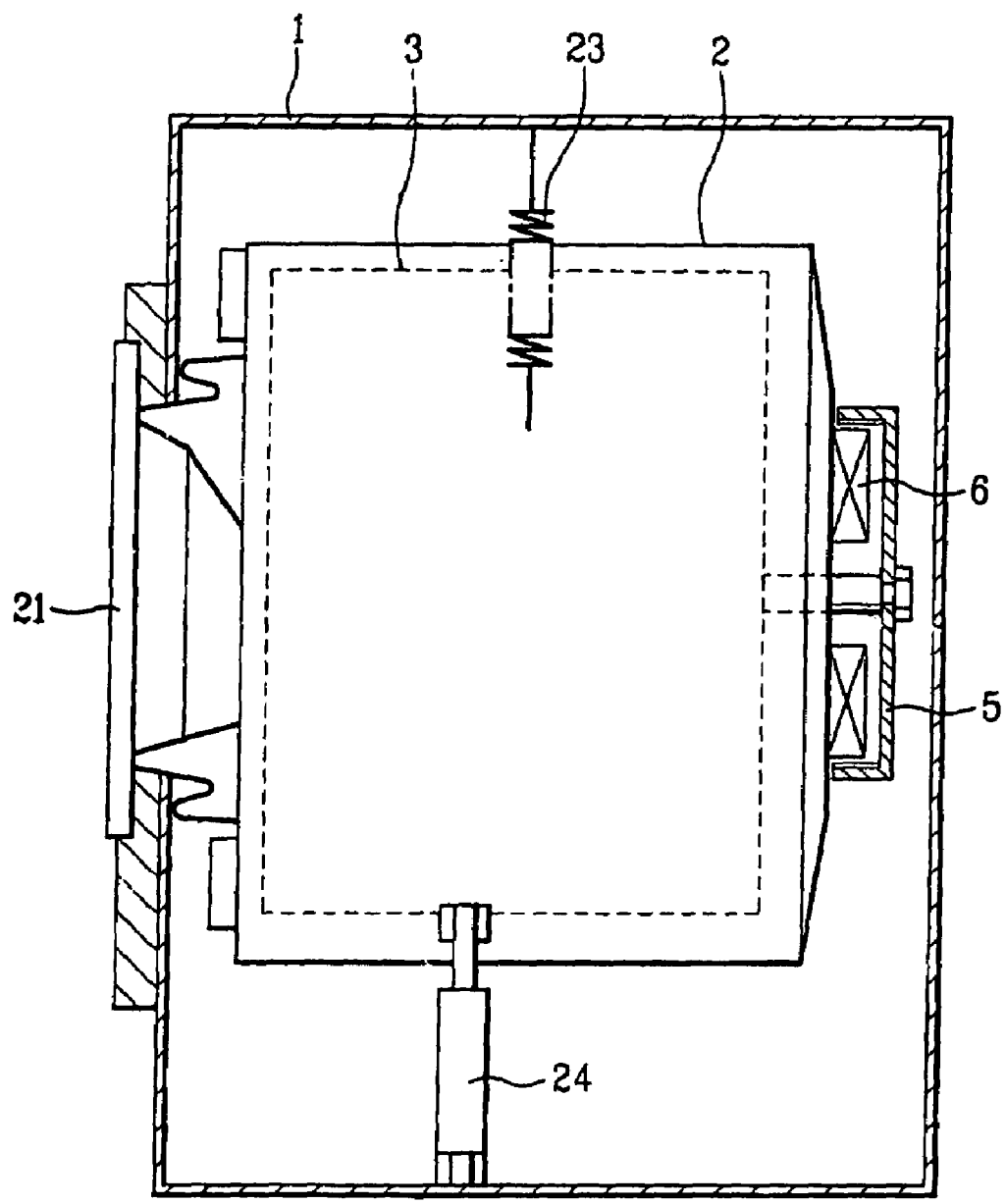
FIG. 1 is a cross-sectional diagram of a direct coupling drum type washer according to a related art.
Figure 2:
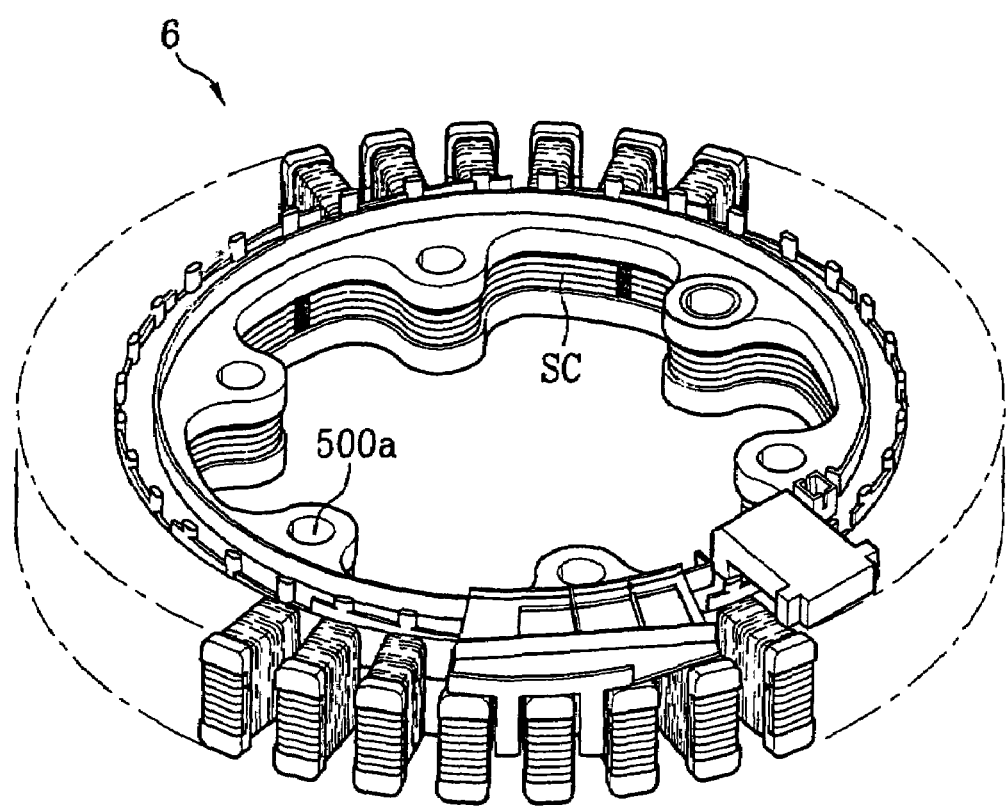
FIG. 2 is a perspective diagram of a stator in FIG. 1.
Figure 3:
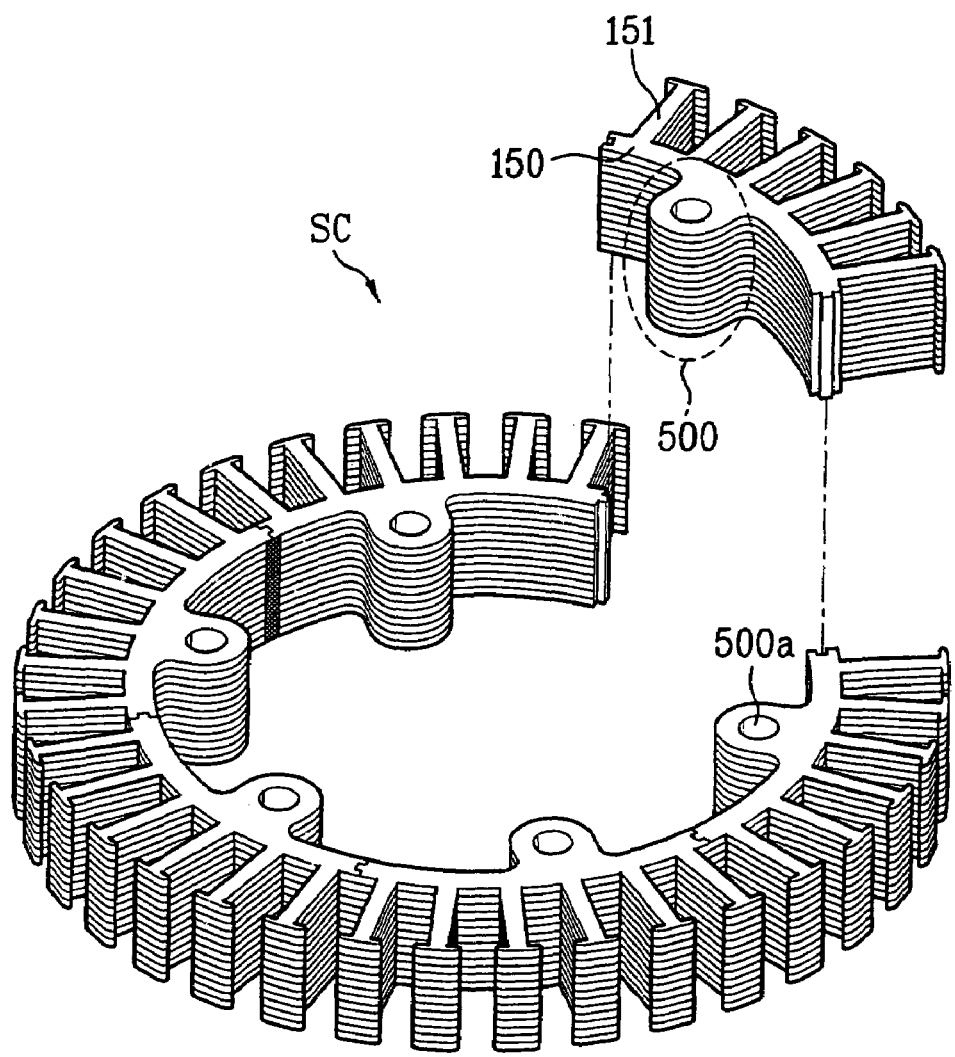
FIG. 3 is a perspective diagram of a sectional core (SC) applied to the stator in FIG. 2.
Figure 4:
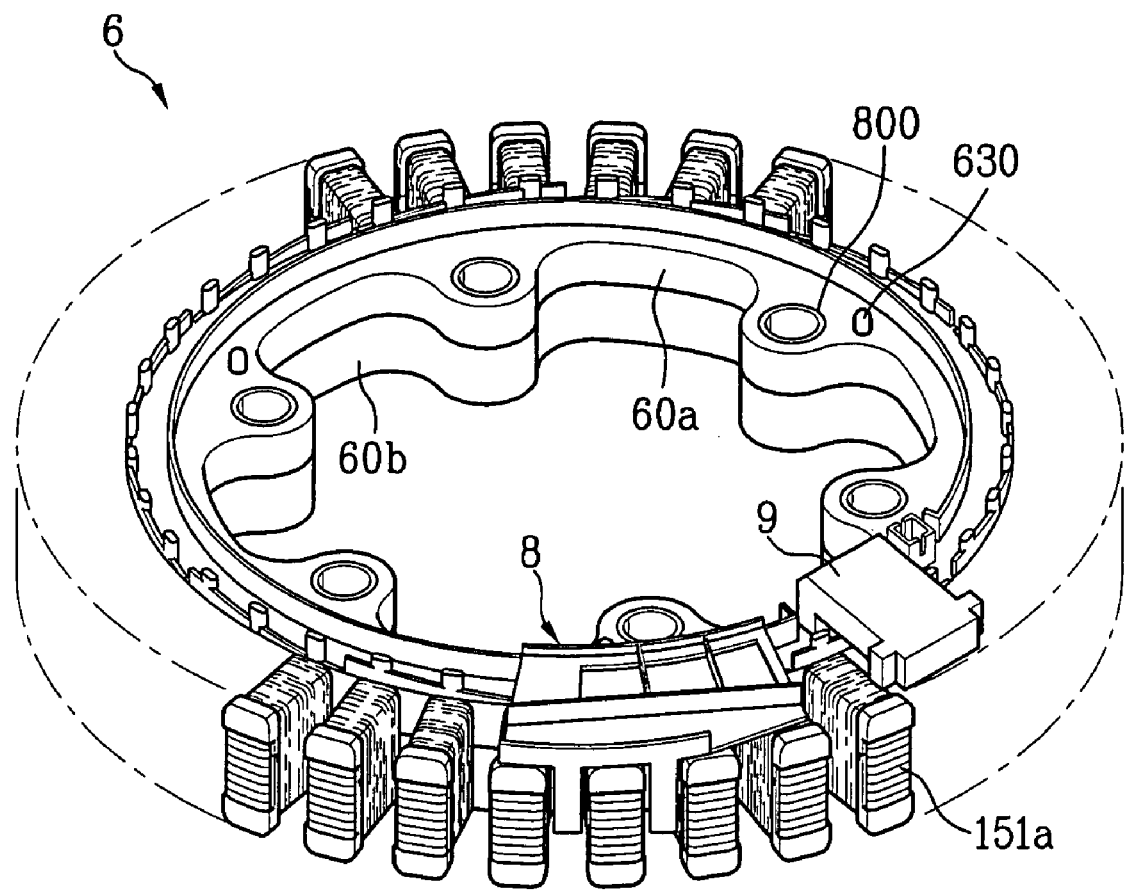
FIG. 4 is a perspective diagram of a stator according to the present invention.
Figure 5:
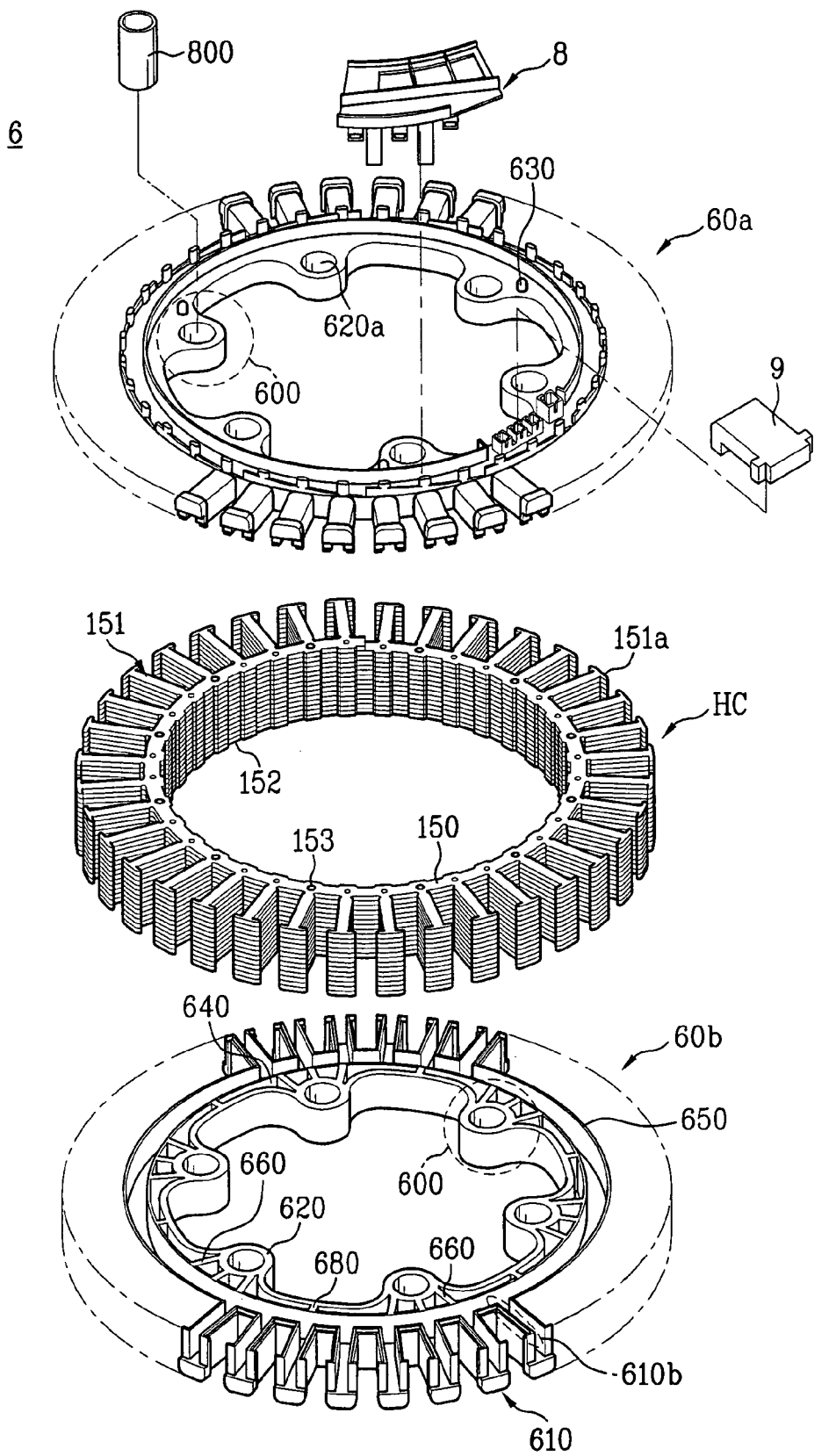
FIG. 5 is a projected perspective diagram of the stator in FIG. 4.
Figure 6:
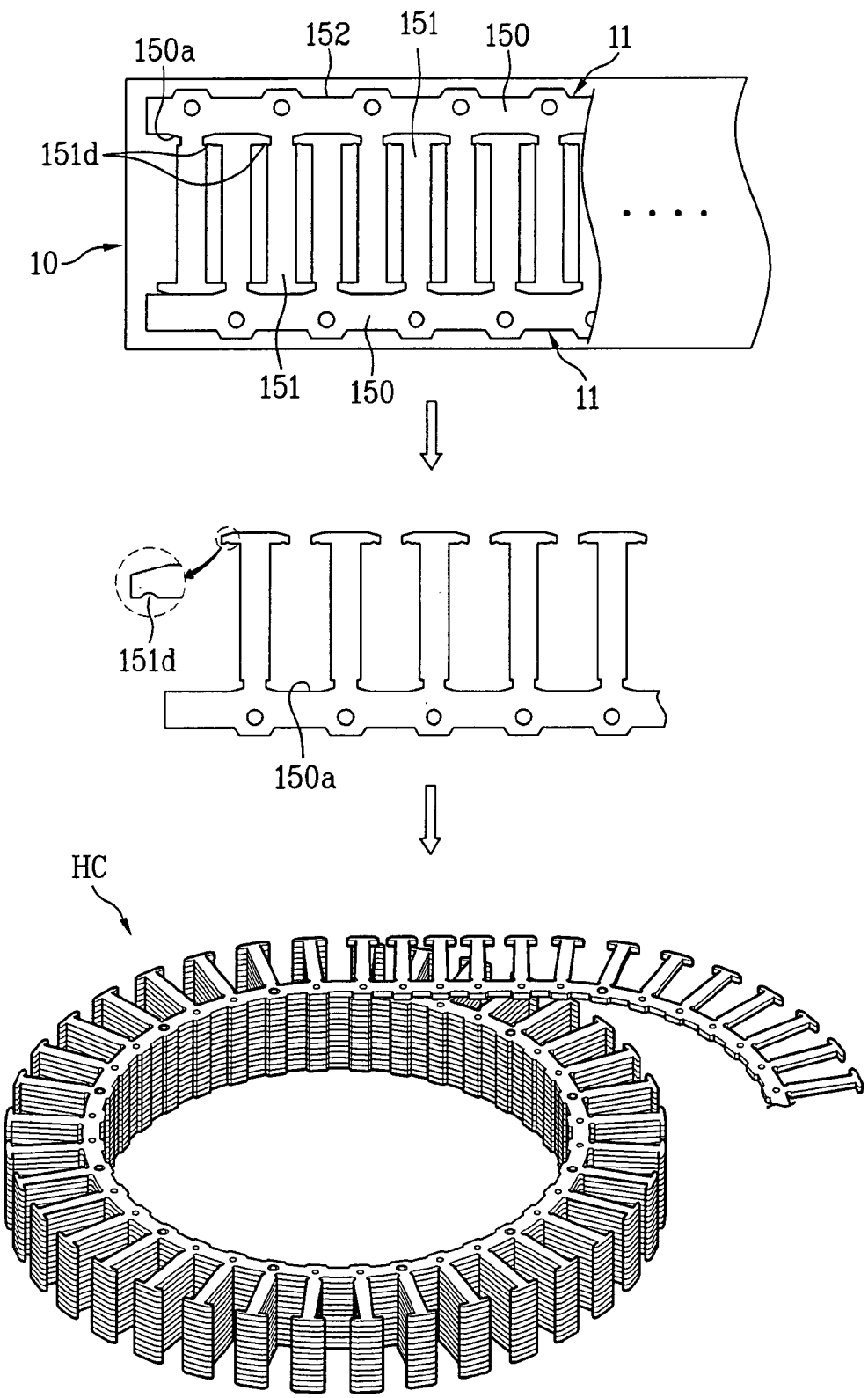
FIG. 6 is a diagram for explaining a process of fabricating a helical core in FIG. 5.
Figure 7:
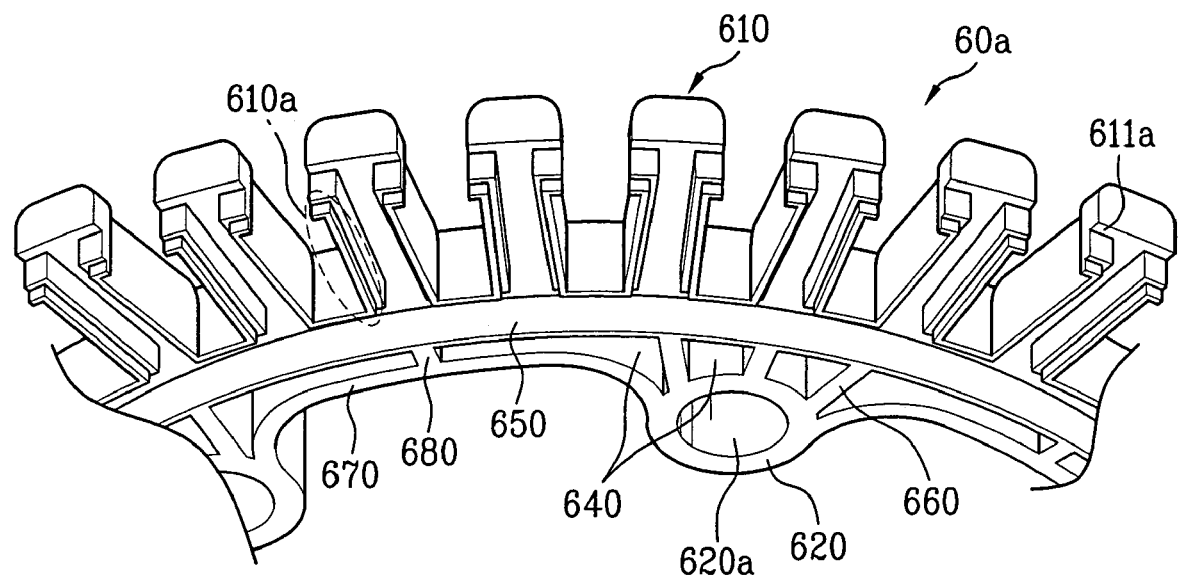
FIG. 7 is a perspective diagram of a backside of an upper insulator in FIG. 5.

FIG. 4 is a perspective diagram of a stator according to the present invention, FIG. 5 is a projected perspective diagram of the stator in FIG. 4, FIG. 6 is a diagram for explaining a process of fabricating a helical core in FIG. 5, and FIG. 7 is a perspective diagram of an inside of an upper insulator in FIG. 5.

A stator 6 of an outer rotor type motor according to one embodiment of the present invention includes a helical core HC having multiple layers formed by winding steel plates in a helix starting from a bottom layer to a top layer, the steel plate having a base portion with teeth projected form the base portion, wherein the steel plates 11 are blanked on an electrical steel sheet 10 in pairs opposing each other with the teeth alternately crossing each other, the steel plate 11 comprising a pair of bases 150 confronting each other with teeth 151 projecting from each of the bases 150 to alternately cross with each other, an upper insulator 60a of an electric insulating material covered on an upper side of the helical core HC in a shape complementary to a shape of the helical core HC, a lower insulator 60b of an electric insulating material covered on a lower side of the helical core HC at the time of assembly with the upper insulator 60a having a shape complementary to a shape of a helical core, and at least three fastening portions 600 formed as one body in each of the upper insulator 60a and the lower insulator 60b which projects from an inside of the helical core HC toward a center of the stator for fastening the stator 6 to a fixing side of a tub.

Specifically, a pair of the steel plates 11 is blanked on the electrical steel sheet 10 in two rows. In doing so, a notch recess 150a having a same shape as a tip of each of the teeth 151 is formed at the corresponding base 150 confronting the corresponding teeth 151.

In performing blanking on the electrical steel sheet 10 to form the steel plate 11 in two rows, ejector concaves 151d are formed at the teeth 151 of the steel plate 11 to facilitate a separation from the other steel plate 11. Hence, the separation of the steel plate 11 formed by blanking of the electrical steel sheet 10 in two rows can be easily separated from the electrical steel sheet 10.

Namely, in separating the steel plate core, an ejector comes into contact with the ejector concaves 151d to apply a pushing force thereto to enable the separation of the steel plates 11.

A fastening portion 600, as shown in FIG. 5, has a fastening hole 620a for securing the stator 6 to a fixing side, such as a tub, with a fastening member. The fastening hole 620a is formed by a boss 620 projected to the back side of the fastening portion 600.

A support rib 650 is provided on an inside along a circumferential direction thereof in contact with the helical core for supporting an inside surface of the helical core HC in each of the upper insulator 60a and lower insulator 60b.

Furthermore, the fastening portion 600 of each of the upper insulator 60a and the lower insulator 60b includes at least one reinforcing rib 660 connected between the boss 620 of the fastening hole 620a and the supporting rib 650 for spreading fastening force concentrated on the boss 620 and reinforcing a strength of the fastening portion 600.

As shown in FIG. 7, the fastening portion 600 of each of the upper insulator 60*a* and the lower insulator 60*b* has a reinforcing rib 670 at an inside circumference thereof, and at least one connection rib 680 connected between the reinforcing rib 670 and the supporting rib 650 which supports an inside surface of the core in a radial direction, for providing a supporting force.

Each of the upper insulator 60*a* and the lower insulator 60*b* has tips 610*a* on opposite sidewalls of each of the teeth 610 thereof having shapes in complementary to each other for fitting in at the time of assembly to form a flush surface.

In this case, if one of the tips 610*a* and 610*b* has a '⌐' shape, the other has a 'L' shape.

At the opposite end surfaces substantially perpendicular to the opposite sidewall surfaces of the teeth 610 of the upper insulator 60*a* and the lower insulator 60*b*, there are tips 610*a* and 610*b* having shapes in complementary to each other. Hence, the further-provided tips 610*a* and 610*b* engage with each other in assembling the upper and lower insulators 60*a* and 60*b*.

The teeth 610 of each of the upper insulator 60*a* and the lower insulator 60*b* has a seating surface 611*a* at an end for seating a core shoe 151*a* of the helical core HC.

Along with this, in the vicinity of the fastening hole 620*a* of the fastening portion 600 of the upper insulator 60*a*, there is a positioning projection 630 having a shape in complementary to a positioning hole or a slot (not shown) in the fixing side of the tub.

Moreover, there is a cylindrical sleeve 800 in the fastening hole 620*a*, a spring pin having an elasticity owing to an incised portion, or a hollow pin enabling press fit in the fastening hole 620*a*, serves as a bushing.

The helical core HC is fastened by rivets 153 passed through pass through holes in the base portion 150.

A winding beginning portion or a bottom layer of the helical core HC and a winding end portion or a top layer of the helical core HC can be welded to predetermined contact portions of the base portion 150.

Figure 8:
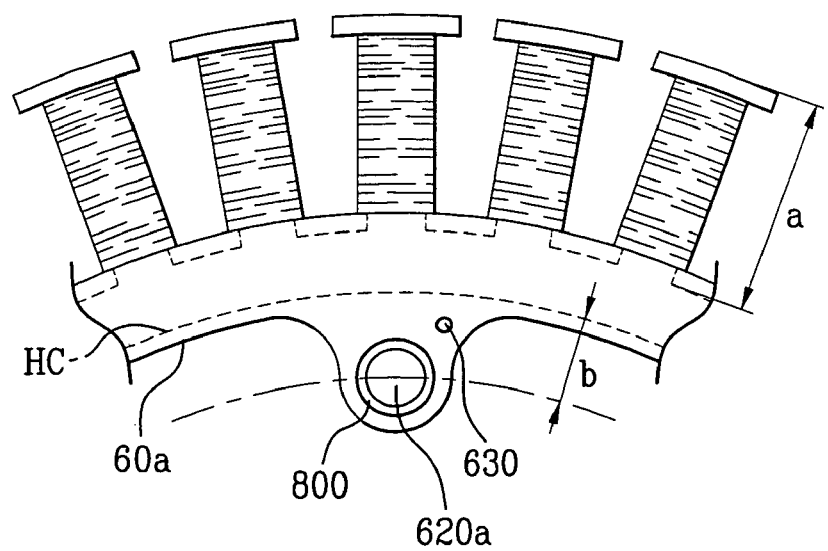
FIG. 8 is a layout of the stator in FIG. 4.

Referring to FIG. 8, the stator 6 according to the present invention includes at least three fastening portions 600 formed as one body in each of the upper insulator 60*a* and the lower insulator 60*b* which projects from an inside of the helical core toward a center of the stator for fastening the stator to a fixing side of a tub.

If a length of each of the teeth 151 projected from a lateral outside of the helical core HC is set to 'a' and if a distance from a lateral inside of the helical core to a center of the fastening hole of the fastening portion 600 is set to 'b', the fastening portion 600 is formed to meet a definition of 'a≧b'.

Meanwhile, a reference number '8' in FIG. 5 indicates a hole sensor assembly for a motor control and a reference number '9' indicates a tap housing assembly for power connection to supply power to the stator side.

An operation of the above-configured present invention is explained as follows.

First of all, the helical core HC, which is formed by winding steel plates in a helix starting from a bottom layer to a top layer, the steel plate having a base portion 150 with teeth 151 projected from the base portion 150, is used as the core configuring the stator. Hence, the present invention does not need the processes of assembling and welding unit cores for the sectional core SC, thereby simplifying the fabricating process.

And, the helical core HC according to the present invention has not the protrusions of the sectional core, thereby reducing the material loss.

Namely, the method of fabricating the stator according to the present invention is simple and reduces the material loss.

Specifically, since the steel plate 11 of the helical core HC is formed by blanking the electrical steel sheet 10 in two rows, the present invention can reduce the material for the core fabrication and facilitate the core fabrication.

Moreover, the stator 6 of the present invention has sufficient rigidity against the fastening force of the bolt in a manner of improving the structure of the upper and lower insulators 60*a* and 60*b* without forming the protrusion for standing the fastening force in fixing the stator 6 to the core itself.

That is, by providing structures that work the same with the projected portion of the division core to the fastening portions 600 of the upper insulator 60*a* and the lower insulator 60*b*, a stator 6 can be provided, to which the helical core HC is applicable.

Moreover, spaces 640 between the ribs 650, 660, 670, and 680 at a back side of the fastening portion 600 dampen and attenuate vibration occurred during driving the motor, to improve mechanical reliability of the stator 6, and contributes to the reduction of the insulator material.

The supporting ribs 650 of the upper insulator 60*a* and the lower insulator 60*b* formed at an inside in contact with the helical core HC along the circumferential direction support an inside of the helical core HC.

The reinforcing rib 660 connected between the boss 620 of the fastening hole 620*a* and the supporting rib 650 at each of the fastening portion 600 of the upper insulator 60*a* and the lower insulator 60*b* spread the fastening force concentrated on the boss 620, and reinforces a strength of the fastening portion 600.

According to this, the stator 6 can effectively prevent a fastening portion of the stator 6 suffering from breakage caused by vibration at the spinning, shaking and deformation of the rotor 5 even at a large capacity drum type washing machine having a weight over 1.5 kg only of the stator, and a spinning speed ranging 600~2,000 RPM.

As a positioning projection 630 in the vicinity of the fastening hole 620*a* of the fastening portion 600 fits in a positioning hole (not shown) in the tub 2, fastening of the stator is easy.

Hence, the location setting projection 630 facilitates the stator 6 according to the present invention to be coupled with the tub 2, whereby a maintenance and repair work of a serviceman can be easily done for after-service.

Alternatively, it is a matter of course that the positioning projection 630 may be formed on the tub 2, and the positioning hole may be formed in the fastening portion 600.

Figure 9A:
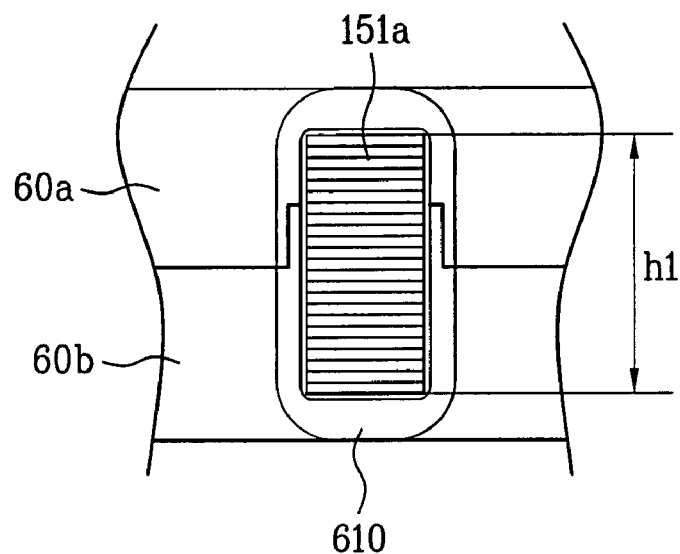
FIG. 9A and FIG. 9B are front diagrams of an insulator for common use.
Figure 9B:
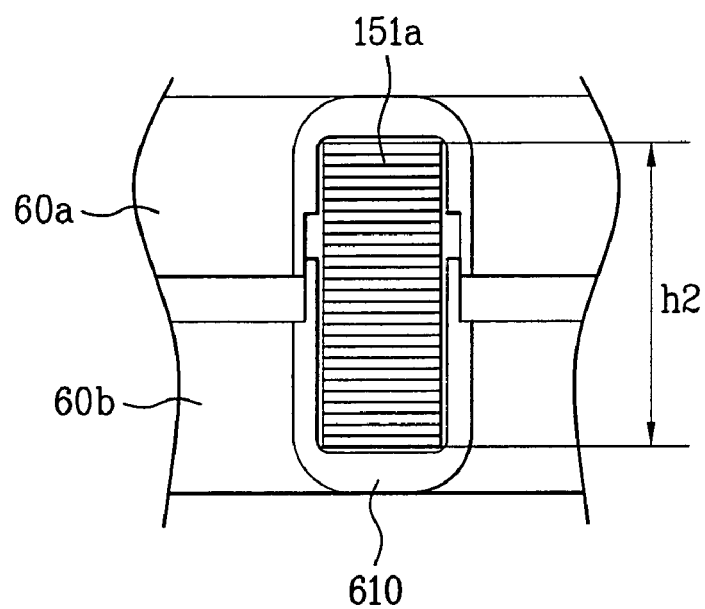

FIG. 9*a* and FIG. 9*b* are reference drawings, illustrating a versatility of application of the insulators, wherein it can be noted that the upper and lower insulators 60*a* and 60*b*, respectively, are applicable even if a total height of the helical core varies within a certain range.

That is, FIG. 9*a* illustrates a case when a total height h1 of the core is a height which permits tips 610*a* and 610*b* of the upper and lower insulators 60*a* and 60*b* fit exactly. FIG. 9*b* illustrates a case when a total height of the core is a height greater than a case of FIG. 9*a* such that the tips 610*a* and 610*b* of the upper and lower insulators 60*a* and 60*b* are unable to fit exactly, but spaced a certain distance.

Even if the total height h2 of the core is greater than a height that permits the tips 610*a* and 610*b* of the upper and lower insulators 60*a* and 60*b*, respectively, fit exactly, such that there is a space between the tips 610*a* and 610*b*, because the insulation against the core teeth is still achievable; the upper and lower insulators 60*a* and 60*b* are applicable to the case of FIG. 9*b*, too.

Thus, since the separate type upper and lower insulators of the embodiment are applicable to the core regardless of the total height of the core within a certain range of the total height, the separate type upper and lower type insulators of the embodiment can improve workability on an assembly line.

Accordingly, the present invention provides the following effects or advantages.

First of all, the material and weight for fabrication are reduced, the fabrication process is simplified, and the stator can be stably assembled to the fixing side such as a tub or a bearing housing.

Specifically, the stator can be stably assembled to the fixing side such as a tub or a bearing housing like the case of applying the sectional core, whereby the stator weighing at least 1.5 kg is applicable to a drum type washer BLDC motor having a rotational speed over 2,000 RPM.

Secondly, the stator is facilitated to be assembled to the tub, whereby a maintenance and repair work of a serviceman can be easily done for after-service.

Thirdly, the present invention reduces the material of the helical core HC and simplifies the core fabrication.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stator of an outer rotor motor for a drum washer, comprising:
   a core having multiple layers, the core having a base portion and teeth projecting from the base portion, an entire inner circumferential surface of the base portion being substantially circular;
   an upper insulator of an electric insulating material covering an upper side of the core in a shape complementary to a shape of the core;
   a lower insulator of an electric insulating material covering a lower side of the core at the time of assembly with the upper insulator having a shape complementary to a shape of the core; and
   at least three fastening portions formed as one body in each of the upper insulator and the lower insulator fastening the stator to a fixing side of a tub, wherein the at least three fastening portions substantially cover an entire inner circumferential surface of the core.

2. The stator of claim 1, wherein the core is a helical core formed by winding steel plates in a helix starting from a bottom layer to a top layer, wherein the steel plates are blanked on an electrical steel sheet in pairs opposing each other with the teeth alternately crossing each other, wherein the steel plate is blanked on the electrical steel sheet in two rows to form at the base portion a notch recess having a same shape as a tip of each of the teeth.

3. A stator of an outer rotor motor for a drum washer, comprising:
   a core having multiple layers, the core having a base portion with teeth projecting from the base portion;
   an upper insulator of an electric insulating material covering an upper side of the core in a shape complementary to a shape of the core;
   a lower insulator of an electric insulating material covering a lower side of the core at the time of assembly with the upper insulator having a shape complementary to a shape of the core; and
   at least three fastening portions formed as one body in each of the upper insulator and the lower insulator fastening the stator to a fixing side of a tub, wherein the at least three fastening portions substantially cover an entire inner circumferential surface of the core,
   wherein each of the teeth has a tip, the tip having a bottom surface facing the base portion, the bottom surface of the tip having at least one ejector concavity to facilitate a separation from a steel plate.

4. The stator of claim 1, wherein a fastening hole is provided to each of the at least three fastening portions to secure the stator to a tub wall with fastening members.

5. The stator of claim 4, wherein the fastening hole in each of the fastening portions is constructed of a boss projecting toward a back side of the fastening portion.

6. The stator of claim 1, wherein each of the upper insulator and the lower insulator includes a supporting rib on an inside along a circumferential direction thereof in contact with the core for supporting an outer circumferential surface of the core.

7. The stator of claim 6, wherein each of the fastening portions of each of the upper insulator and the lower insulator includes at least one reinforcing rib connected between the boss of the fastening hole and the supporting rib for spreading fastening force concentrated on the boss and reinforcing strength of the fastening portions.

8. The stator of claim 1, wherein each of the upper insulator and the lower insulator includes tips on opposite sidewalls of each of the teeth thereof having shapes in complementary to each other for fitting in at the time of assembly to form a flush surface.

9. The stator of claim 8, wherein the tips on opposite sidewalls of each of the teeth include 'L' shape if the other side of the upper, and lower insulators includes a '⌐' shape.

10. The stator of claim 1, further comprising tips having shape in complementary to each other at opposite end surfaces substantially perpendicular to the opposite sidewall surfaces of the teeth of the upper insulator and the lower insulator.

11. The stator of claim 1, wherein each of the upper insulator and the lower insulator includes tooth covers for receiving the teeth of the core, each tooth cover including a seating portion at an end of the tooth covers for seating a top surface or a bottom surface of a core shoe of the core, the core shoe being at an end of the tooth opposite to the base portion.

12. The stator of claim 1, wherein the upper insulator includes a positioning projection in the vicinity of the fastening hole thereof having a shape complementary to a positioning hole or a slot on a tub.

13. The stator of claim 12, further comprising a cylindrical sleeve on an inside of the fastening hole.

14. The stator of claim 13, wherein the cylindrical sleeve is a spring pin having elasticity owing to a portion incised along a length direction of an outside surface.

15. The stator of claim 13, wherein the cylindrical sleeve is a hollow pin press fit in the fastening hole, the cylindrical sleeve having no incised portion.

16. The stator of claim 1, wherein the base portion of the core includes slots for reducing stress during winding the core.

17. The stator of claim 1, wherein the multiple layers are fastened by rivets passed through pass through holes in the base portion.

18. The stator of clam 1, wherein the bottom layer and the top layer of the core are welded to predetermined portions of the base portion, respectively.

19. The stator of claim 1, wherein if the length of each of the teeth projecting from an outer circumferential surface of the core is set to 'a' and if a distance from the inner circumferential surface of the core to a center of a fastening hole of a fastening portion is set to 'b', 'a' is equal to or greater than 'b' (a≧b).

20. A method of fabricating a stator of an outer rotor motor for a drum washer, comprising the steps of:
    forming a core having multiple layers, the core having a base portion and teeth projecting from the base portion, an entire inner circumferential surface of the base portion being substantially circular; and
    covering the core by an insulator of an electric insulating material in a shape complementary to a shape of the core, wherein the insulator comprises at least three fastening portions formed as one body in each of the upper insulator and the lower insulator fastening the stator to a fixing side of a tub, the at least three fastening portions substantially covering an entire inner circumferential surface of the core.

21. The method of claim 20, further comprising:
    preparing an electrical steel sheet; and
    blanking a pair of steel plates on the electrical steel sheet in two rows, the steel plate comprising a pair of the base portions confronting each other with the teeth projecting from each of the base portions to alternately cross with each other;
    wherein the step of forming the core includes forming a helical core having the multiple layers formed by winding the steel plates in a helix starting from a bottom layer to a top layer;
    wherein the steel plate is blanked on the electrical steel sheet in two rows to form at the base a notch recess having a same shape as a tip of each of the teeth.

22. A method of fabricating a stator of an outer rotor motor for a drum washer, comprising the steps of:
    forming a core having multiple layers, the core having a base portion with teeth projecting from the base portion; and
    covering the core by an insulator of an electric insulating material in a shape complementary to a shape of the core, wherein the insulator comprises at least three fastening portions formed as one body in each of the upper insulator and the lower insulator fastening the stator to a fixing side of a tub, the at least three fastening portions substantially covering an entire inner circumferential surface of the core,
    wherein each of the teeth has a tip, the tip having a bottom surface facing the base portion, the bottom surface of the tip having at least one ejector concavity to facilitate a separation from the other steel plate.

23. The method of claim 20, wherein the core enclosing step comprises the steps of:
    covering on an upper side of the core with an upper insulator having a shape complementary to a shape of the core; and
    covering on a lower side of the core with a lower insulator having a shape complementary to a shape of the core.

24. A stator of an outer rotor motor for a drum washer, comprising:
    a helical core having multiple layers formed by winding steel plates in a helix starting from a bottom layer to a top layer, the steel plate having a base portion with teeth projected from the base portion, wherein the steel plates are blanked on an electrical steel sheet in pairs opposing each other with the teeth alternately crossing each other;
    an upper insulator of an electric insulating material covered on an upper side of the helical core in a shape complementary to a shape of the helical core;
    a lower insulator of an electric insulating material covered on a lower side of the helical core at the time of assembly with the upper insulator having a shape complementary to a shape of a helical core; and
    a cylindrical sleeve on an inside of the fastening hole, the cylindrical sleeve being a spring pin having elasticity owing to a portion incised along a length direction of an outside surface.

25. The stator of claim 1, wherein a seating portion extends upwardly from the top surface of the core or downwardly from the bottom surface of the core.

26. A stator of an outer rotor motor for a drum washer, comprising:
    a core having multiple layers, the core having a base portion with teeth projecting from the base portion;
    an upper insulator of an electric insulating material covering an upper side of the core in a shape complementary to a shape of the core;
    a lower insulator of an electric insulating material covering a lower side of the core at the time of assembly with the upper insulator having a shape complementary to a shape of the core; and
    at least three fastening portions formed as one body in each of the upper insulator and the lower insulator fastening the stator to a fixing side of a tub, wherein the at least three fastening portions substantially cover an entire inner circumferential surface of the core,
    wherein the upper insulator includes a first inner rib, the first inner rib having a substantially constant first inner diameter, the first inner rib of the upper insulator being located at and extending along substantially the entire inner circumferential surface of the core.

27. The stator of claim 26, wherein the lower insulator includes a second inner rib, the second inner rib having a substantially constant second inner diameter, the second inner rib of the lower insulator being located at and extending along substantially the entire inner circumferential surface of the core.

28. The stator of claim 27, wherein the base portion has a substantially circular inner circumferential surface, wherein a fastening hole is provided to each of the at least three fastening portions to secure the stator to a tub wall with fastening members, and wherein each of the fastening portions of each of the upper insulator and the lower insulator includes at least one reinforcing rib connected between the boss of the fastening hole and the supporting rib for spreading fastening force concentrated on the boss and reinforcing strength of the fastening portions.

* * * * *